United States Patent
Hamoir

(10) Patent No.: US 7,184,659 B2
(45) Date of Patent: Feb. 27, 2007

(54) METHOD FOR THE MODULATION OF SIGNAL WAVELENGTHS AND METHOD FOR THE DETECTION AND CORRECTION OF BIT ERRORS IN OPTICAL TRANSMISSION SYSTEMS

(75) Inventor: Dominique Hamoir, Nozay (FR)

(73) Assignee: Alcatel, Paris (FR)

( * ) Notice: Subject to any disclaimer, the term of this patent is extended or adjusted under 35 U.S.C. 154(b) by 569 days.

(21) Appl. No.: 10/244,482

(22) Filed: Sep. 17, 2002

(65) Prior Publication Data
US 2003/0063353 A1    Apr. 3, 2003

(30) Foreign Application Priority Data
Sep. 24, 2001    (EP) ................... 01440312

(51) Int. Cl.
*H04B 10/00*    (2006.01)
(52) U.S. Cl. .......................... 398/5; 398/194
(58) Field of Classification Search .................. 398/5, 398/63, 192, 194, 27
See application file for complete search history.

(56) References Cited

U.S. PATENT DOCUMENTS

| | | | |
|---|---|---|---|
| 4,616,898 A | * | 10/1986 | Hicks, Jr. .................. 385/24 |
| 4,878,726 A | * | 11/1989 | Fatehi ....................... 385/16 |
| 5,105,293 A | * | 4/1992 | Bortolini .................... 398/141 |
| 5,530,575 A | * | 6/1996 | Acampora et al. ........... 398/58 |
| 5,657,153 A | * | 8/1997 | Endriz et al. ............. 359/341.1 |
| 5,661,585 A | * | 8/1997 | Feldman et al. .............. 398/63 |
| 5,715,076 A | * | 2/1998 | Alexander et al. ........... 398/87 |
| 2001/0010693 A1 | | 8/2001 | Wedding et al. ............ 370/400 |

FOREIGN PATENT DOCUMENTS

WO    WO 0108422 A2    2/2001

OTHER PUBLICATIONS

Hyang K. Kim et al, Reduction of Cross-Gain Modulation in the Semiconductor Optical Amplifier by Using Wavelength Modulated Signal, IEEE Photonics Technology Letters, IEEE, Inc., New York, US; vol. 12, No. 10, Oct. 2000, pp. 1412-1414, XP000970150.

* cited by examiner

*Primary Examiner*—Christina Leung
(74) *Attorney, Agent, or Firm*—Sughrue Mion, PLLC

(57) ABSTRACT

The present invention relates to a method for the modulation of the signal power in optical transmission systems comprising an optical amplification device. Also a method for the detection of bit errors in the processing of digitalized transmitted data is disclosed whereby the data are transmitted by an optical transmission system.

10 Claims, 2 Drawing Sheets

Figure 1:
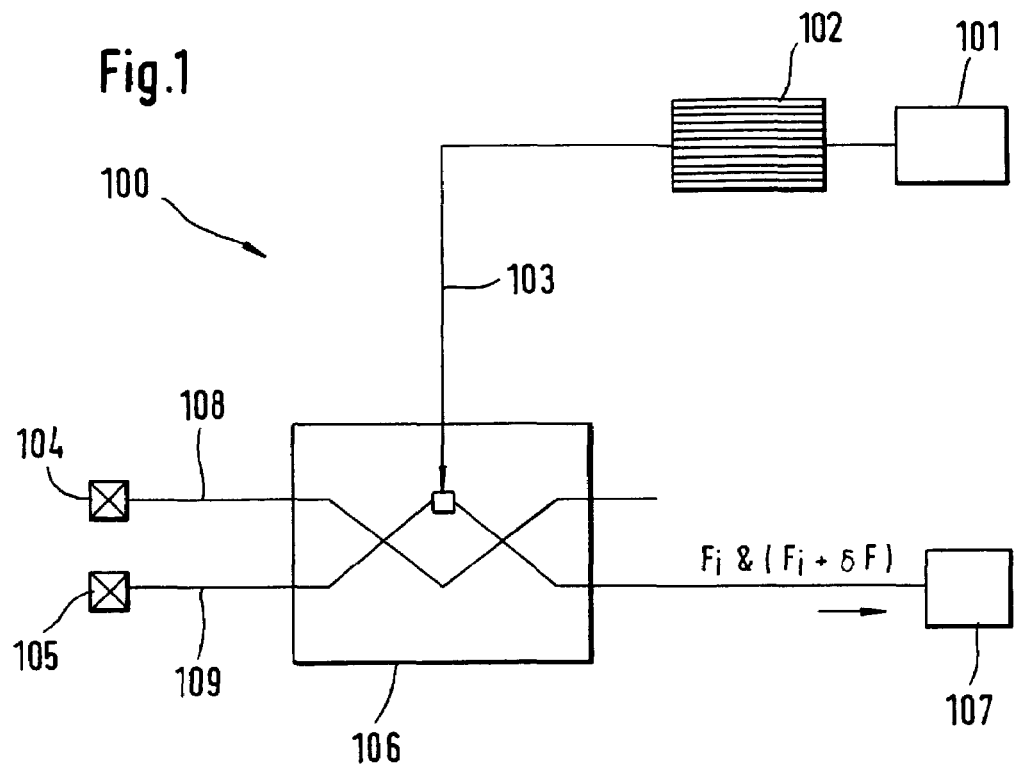

$F_i$ & $(F_i + \delta F)$

METHOD FOR THE MODULATION OF SIGNAL WAVELENGTHS AND METHOD FOR THE DETECTION AND CORRECTION OF BIT ERRORS IN OPTICAL TRANSMISSION SYSTEMS The invention is based on a priority application EP 01 440 312.5 which is hereby incorporated by reference.

BACKGROUND OF THE INVENTION

The present invention relates to a method for the modulation of the signal power in optical transmission systems comprising at least one optical amplification device and to a method for the detection of bit errors in the processing of digitalized transmitted data, whereby the data are transmitted by an optical transmission system.

Optical communication systems are a fast-growing constituent of communication networks. The term "optical communication system" as used in the following relates to any system or device which makes use of optical signals to transport information across an optical waveguiding medium. Optical communication systems comprise inter alia telecommunication systems, local area networks (LAN), cable television systems etc.

For the transmission capacity of optical fibres in optical communication systems is expected to advance in the future, the evolution of optical amplification is one of the core technologies involved in this process. A key to this evolution is the availability of extremely-broad-band optical amplifiers, offering amplification over nearly all the transmission window allowed by silica. These requirements can be met inter alia by Raman amplification.

Optical fibre Raman amplifiers (FRA) are well known and are known to be designed to operate at a desired wavelength between 1.25 µm and 1.7 µm. FRA utilize silica-based fibres and display a high transparency when unpumped. The working principle of FRA is based on stimulated Raman scattering as for example explained in the Ph.D. thesis of P. Riedel with the title "Untersuchungen zum künftigen Einsatz solitonengestützter faseroptischer Nachrichtenübertragung bei 1,3 µm Wellenlänge", Hamburg 1998, the disclosure of which is incorporated herein by reference. FRA can serve for example as a replacement for conventional repeaters or semiconductor-amplifiers, or for rare-earth-doped fibre amplifiers or in combination with them.

The transmission capacity of optical fibres is expected to advance in the future with the objective of reaching 10 Tbit/s capacities, and over. However, even with an extremely good spectral efficiency of 0.8 as in some amplification arrangements disclosed in the prior art, the useful bandwidth that is required to stuff a transmission capacity of 10 Tbit/s is in excess of 12.5 THz.

A key to this evolution toward capacities over 10 Tbit/s is the availability of extremely-broad-band optical amplifiers, offering amplification over nearly all the transmission window allowed by silica. These requirements can be met inter alia by Raman amplification.

Raman amplification allows to extend the transmission to wavelengths which are not addressed by fibres doped with rare-earth elements, for example Erbium or Thulium. This means, that Raman amplification opens the possibility to have optical transmission systems either in the 1.3-µm transmission window as well as in the 1.5-µm transmission window, or even in the 1.4-µm and 1.6-µm wavelength regions.

Usually, the approximate values for the bandwidths of the different "bands" as explained in the foregoing as well as in the following can be summarized as follows:

TABLE 1

| XS-band | S-Band | C-band | L-Band |
|---|---|---|---|
| 1270 to 1350 nm | 1450 to 1525 nm | 1525 to 1565 nm | 1565 to 1610 nm |
| 230 to 228 THz | 204 to 199 THz | 196 to 191 THz | 191 to 186 THz |

Bandwidths larger than approximately 1605 nm are conventionally termed as "XL-band".

The bandwidth values in table 1 are given in nm and in Hz since channels of optical systems are spaced in frequency.

Raman tilt, however, is extremely intense in very-wide-band transmissions, for example in the combined C+L band, and even more in the combined C+L+XL bands. As a consequence, any important fluctuation in signal power (many channels in a sub-band which are simultaneously at 0 or 1) would significantly alter the system performance.

The power in each channel, or group of channels, covering approximately 1 THz should thus be kept constant over time, on a time scale in the order of 10 bit times or even less (about 10 bit times for a 10 Gb/s per channel transmission over Alcatel TeraLight® fibre, about 5 bit times over other commercial non-zero dispersion shifted fibres).

Similar problems have been observed with Semiconductor amplifiers (SOA), which display a high cross gain modulation (CGM). Therefore a SOA does perceive any variation in the signal power, even on bit-time scale, i.e. problems arise from crosstalk. Kim et al. (OAA 2000, Quebec, paper OtuB3 and PDP2, 2000) proposed a wavelength modulation technique to reduce the CGM effect. This modulation technique is based on the constant channel power where the information is coded in a form of wavelength modulation which is implemented by using a dual input-single output Mach-Zehnder $LiNbO_3$ modulator.

CGM, which results from spectral hole-burning is also expected to occur, though with a much longer time-scale, in rare-earth-doped amplifiers, or other types of amplifiers, thus degrading the system performance in the instance of very long sequences of "zeroes (0)" or of "ones (1)".

SUMMARY OF THE INVENTION

The underlying problem of the present invention is therefore to maintain the power of each channel constant over time in optical communication systems and further simultaneously detecting and eliminating bit errors in the transmitted data.

This problem is solved by a method for the modulation of the signal power in optical transmission systems, whereby the method comprises the following steps:
c) providing a data channel for the optical transmission of signals
d) twinning the data channel of step a) with a complementary channel.

The method according to the invention makes sure that the signal power is kept strictly constant over time on a "per-data-channel" basis. As a consequence transient effects, for example due to fluctuations in Raman tilt are eliminated. This allows the use of a large variety of amplifiers (Raman amplifier, rare-earth doped amplifiers, semiconductor optical amplifiers) which can be chosen according to the needs of the respective application.

The complementary channel carries the same information as the main channel. The information is preferably replicated on the complementary channel. Information is therefore transmitted twice. The complementary channel has opposite polarity with respect to the main channel.

Preferentially the data channel and the complementary channel are spaced apart in a frequency range of from 10 to 1000 GHz, preferably from 10 to 500 GHz. Most preferred, they are not more than 50 GHz spaced apart. The closer the better to avoid any temporal drift of one channel relative to the other due to chromatic dispersion.

The data channel and the complementary channel are de-multiplexed at a reception device and the complementary channel is filtered out at the reception device.

In a preferred embodiment, a plurality of data channels are twinned with complementary channels. The channels are then preferably arranged such that the odd (respectively even) channels of the resulting multiplex are the data channels, and such that the complementary channel of any given data channel is the consecutive (or preceding) even (respectively odd) channel.

Advantageously, the optical amplification device includes a Raman fibre amplifier or a rare earth doped fibre amplifier. The Raman tilt and the cross-gain modulation as observed in prior art are avoided.

The problem underlying the invention is further solved by a method for the detection of bit errors in the processing of digitalized transmitted data, whereby the data are transmitted by an optical transmission system, comprising the following steps f) providing a data channel for the optical transmission of signals
g) twinning the data channel of step a) with a complementary channel
h) demultiplexing the data channel from the complementary channel
i) collecting separately the data carried by the complementary channel and the data carried by the data channel
j) comparing the data carried by the complementary channel with the data carried by the data channel.

This method avoids the rejection of the data transmitted on the complementary channel and further allows the use of the other half of the occupied optical bandwidth. The comparison of the data transmitted on the data channel and on the complementary channel allows the location and the correction of any errors in the data transmitted on the data channel.

After the demultiplexing of the complementary channel from its associated data channel, each transmitted bit detected on the complementary channel is compared to that simultaneously detected on the main data channel. This allows a Forward Error Correction (FEC) process (i.e. detection and correction of bit errors in a stream of bits, after reception).

Preferentially the data channel and the complementary channel are very close in frequency, preferably less than 500 GHz apart and even more preferably no more than 50 GHz apart. The closer the better to avoid any temporal drift of one channel relative to the other due to chromatic dispersion. They are preferably twined such that, if the data channel is an even channel the associated complementary channel is the closest odd channel in the multiplex of channels (and vice-versa). Because the data channel and the complementary channel have opposite polarity, the probability that data coded as "1" on the data channel are detected as "0" while the corresponding data on the complementary channel (en-coded with opposite polarity as "0") are detected as "1" will be particularly small. This is due to the fact that in twinned channels the fluctuations in optical power due to optical transmission (e.g. propagation, amplification, noise accumulation, . . . ) are more likely correlated than counter- or de-correlated.

A bit-error rate (BER) of $10^{-4}$ per channel before the bit-to-bit comparison according to the invention leads to the identification of 1 bit error on average every 5000 bits.

In a preferred embodiment, a selected number of control bits are added to a selected portion of compared bits. Preferably, the number of control bits is in the range of from 1 to 50 for each 1000 compared bits. More preferred are less than 10 and even most preferred are less than 5 control bits for each 1000 bits added. This allows to determine which of the twinned channels was affected by a specifically locatable bit error, and in consequence to correct the bit error.

The method according to the invention leads to a 100 % to 105% overhead FEC together with the suppression of CGM and of Raman induced transients. This depends on the amplification device used in the method according to the invention. The overhead of a FEC method is the quantity of extra-information (extra-bits) added to the initial information (initial number of bits) for allowing data control and recovery. In the method according to the invention, the quantity of information is doubled (neglecting the few control bits) by replicating the data channel onto the complementary channel, corresponding to a 100% overhead.

Any channel failure can be detected by the method according to the invention, because the simultaneous absence or presence of optical power on both channels for more than a few bit times is physically anomalous. Furthermore, the sensitivity of the transmitted data to background noise is significantly reduced because the actual data and its complementary data are simultaneously transmitted with opposite polarity through both channels, which further facilitates the implementation and use of an adaptive trigger level. The complementary channel offers a reference, for adjusting the trigger level: the trigger level is optimized when bits simultaneously detected on the data and on the complementary channels are opposite.

DEFINITIONS OF TERMS

In the following the terms as used herein are defined as follows:

| | |
|---|---|
| bit error rate (BER): | The number of erroneous bits divided by the total number of bits transmitted, Examples of bit error rate are (a) the BER before the bit-to-bit comparison of the total number of bits misinterpreted when received (optical to electrical conversion) divided by the total number of bits transmitted; and (b) the BER after bit-to-bit comparison, i.e., the number of erroneous bits still present after decoding (correction) divided by the total number bits delivered to a client: The BER is usually expressed as a coefficient and a power of 10; for example, 2.,5 erroneous bits out of 100,000 bits transmitted would be 2.5 out of $10^5$ or $2.5 \times 10^{-5}$. |
| cross modulation | Intermodulation caused by the modulation of the carrier of a desired signal by an undesired signal. |
| crosstalk | Any phenomenon by which a signal transmitted on one circuit or channel of a transmission system creates an undesired effect in another circuit or channel. |
| forward error correction (FEC) | A system of error control for data transmission wherein the receiving device has the capability to |

| | -continued |
|---|---|
| | detect and correct any character or code block that contains fewer than a predetermined number of symbols in error. FEC is accomplished by adding bits to each transmitted character or code block, using a predetermined algorithm. |
| Non-return-to-zero (NRZ) | A code in which "1s" are represented by one significant condition and "0s" are represented by another, with no neutral or rest condition, such as a zero amplitude in amplitude modulation (AM), zero phase shift in phase-shift keying (PSK), or mid-frequency in frequency-shift keying (FSK). |
| Phase modulation (PM) | Angle modulation in which the phase angle of a carrier is caused to depart from its reference value by an amount proportional to the instantaneous value of the modulating signal. |
| Polarization | Of an electromagnetic wave, the property that describes the orientation, i.e., time-varying direction and amplitude, of the electric field vector. States of polarization are described in terms of the figures traced as a function of time by the projection of the extremity of a representation of the electric vector onto a fixed plane in space, which plane is perpendicular to the direction of propagation. In general, the figure, i.e., polarization, is elliptical and is traced in a clockwise or counterclockwise sense, as viewed in the direction of propagation. If the major and minor axes of the ellipse are equal, the polarization is said to be circular. If the minor axis of the ellipse is zero, the polarization is said to be linear. Rotation of the electric vector in a clockwise sense is designated right-hand polarization, and rotation in a counterclockwise sense is designated left-hand polarization |
| Wavelength-division-multiplexing (WDM) | In optical fiber communications, any technique by which two or more optical signals having different wavelengths may be simultaneously transmitted in the same direction over one fiber, and then be separated by wavelength at the distant end. |
| Transmission window | In fiber optics, a band of wavelengths at which an optical fiber is sufficiently transparent for practical use in communications applications. |

It is understood that the aforementioned advantages and the features of the invention as further explained in the following, are not only used in the specifically described combination, but can also be used by a person skilled in the art in other combinations or alone, without exceeding the scope of the invention.

FIGURES

Figure 2:
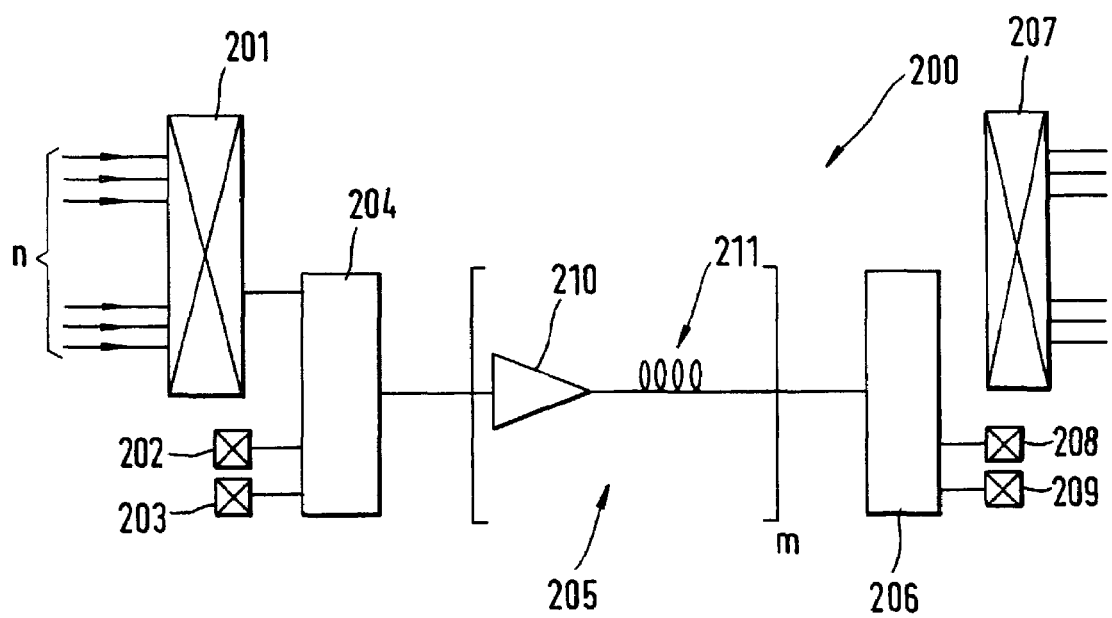
Figure 3:
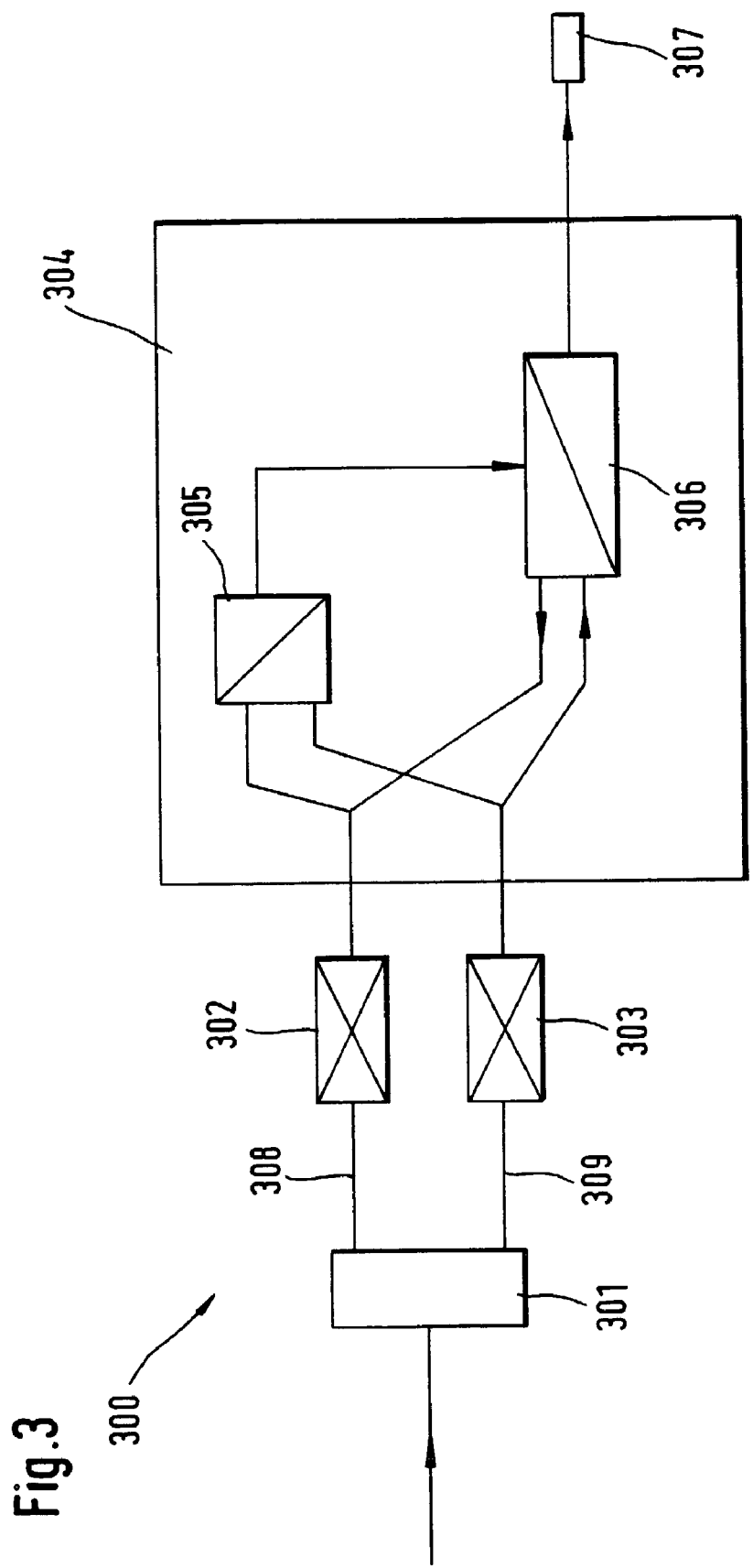

The invention is schematically explained in FIGS. 1 to 3 and described in detail, where reference is made to the drawings.

FIG. 1 schematically shows a transmitter for a optical transmission/communication system for carrying out the methods according to the invention, FIG. 2 shows an example of a optical transmission/communication system for carrying out the methods according to the invention FIG. 3 shows a reception module for a optical transmission/communication system for carrying out the methods according to the invention.

FIG. 1 shows a transmitter 100 for each data channel in a optical transmission/communication system. The number of data channels and transmitters, respectively, in such a system is not restricted and may be chosen according to specific setup and the application desired. For convenience, only the setup for one transmitter for one specific data channel is explained. The optical transmission/communication is not restricted in its components or setup. Every optical transmission/communication system known to a person skilled in the art may therefore be used for the present purpose.

Incoming data, for example with a transmission rate of from 1 to 20 Gb/s, preferably 10 Gb/s, arrive from client 101 (also termed as client A) at a FEC encoder 102, which adds a selected number of control bits to a selected portion of bits which are to be compared. The number of control bits is in the range of from 1 to 50 for each 1000 bits to be compared. Preferably 5 bits for each 1000 bits to be compared are selected. This leads to a transmission rate of 10,05 Gb/s. A NRZ (non-return-to-zero) electrical signal 103 of for example 10 Tb/s drives the electro-optical phase shifter of the Mach-Zehnder-modulator 106. The Mach-Zehnder-modulator 106 serves for the simultaneous electro-optical conversion of the data to the main channel 108 and to the complementary channel 109. The main channel 108 and the complementary channel 109 are fed by continuous wave (CW) laser diodes 104 and 105 respectively. The choice of the laser device depends upon the specific setup and may include semiconductor laser diodes, dye lasers, fibre lasers, etc. and may be boosted by a further amplifier such as e.g. a fibre amplifier or a semiconductor optical amplifier (SOA).

The CW laser diode 104 has a frequency of $F_i=c/\lambda_i$ and the CW laser diode 105 of $F_i+\delta F$.

The spacing $\delta F$ between the main channel 108 and the complementary channel 109 is in a frequency range of from 10 to 1000 GHz, preferably of from 10 to 200 and most preferred of from 10 to 50. In the setup as shown in FIG. 1, $\delta F$ is 50 Ghz.

If $\delta F$ is about 50 Ghz, then the spacing of several main channels (not shown in FIG. 1) is in the range of $F_{i+1}-F_i=100$ GHz. Corresponding relations have to be observed when choosing another $\delta F$.

After having passed the Mach-Zehnder modulator, the combined frequencies of the twinned main and complementary channel $F_i$ & ($F_i+\delta F$) are transmitted to a multiplexer 107. This multiplexer can be any multiplexer known to a person skilled in the art.

FIG. 2 shows an optical transmission/communication system 200. The incoming data from n transmitters as explained under FIG. 1 arrive at Dense-Wavelength-Division Multiplexers (DWDM) 201, 202, 203. As explained in the foregoing, n is the number of transmitters and may be arbitrarily selected according to the specific system setup. Depending upon the bandwidth of the transmitters, one DWDM is selected for every transmission band. In FIG. 2, DWDM 201 covers the C-band with a frequeny range of 192–196 THz, DWDM 201 covers the L-band with a frequency range of 187–191 THz and DWDM 203 the XL-band with a frequency range from 182–186 THz. The different transmission bands are multiplexed in a band multiplexer 204 and transmitted to an amplification unit 205. The amplification may take place in one amplification unit 205 or in m subsequently arranged amplification units, whereby the number m may be selected according to the specific system setup. A person skilled in the art will preferably choose 5 subsequently arranged amplification units 205. Such an amplification unit 205 comprises inter alia dispersion compensation devices and network functions such as Optical add-drop multiplexers (OADM)). The amplication unit further comprises one or more amplifiers 210, like rare-earth amplifier fibres (EDFA or TDFA), Raman amplifier fibres (FRA) or combinations of both. The amplification unit 205 comprises further a transmission fibre 211, for example a 80 km Alcatel-Teralight® transmission fibre.

After having passed the amplification unit 205, the transmission bands are demultiplexed at a band demultiplexer 206. The wavelengths of the C-band, L-band and XL-band are demultiplexed in the corresponding DWDM 207 for the C-band, 208 for the L-band and 209 for the XL-band and are further transmitted to a reception module as explained in the following. Any DWDM known by a person skiled in the art is suitable.

FIG. 3 shows a reception module 300 for an optical transmission/communication system as explained in the foregoing. Each data channel is equipped with such a reception module 300.

The data of the twinned main and complementary channels which arrive from the demultiplexers explained under FIG. 2 with the combined frequencies $F_1$ & $(F_i+\delta F)$ are demultiplexed in a demultiplexer 301 into the corresponding frequencies $F_1$ for the main channel 308 and into $(F_i+\delta F)$ for the complementary channel 309. Each of these frequencies is transmitted to a detector 302 and 303 respectively.

The main and complementary channel 308 and 309 are then subjected to a Forward Error Correction (FEC) process in a forward error corrector 304. The forward error corrector is generally an electronic board comprising in particular the XOR 305 and device 306. A nonlimiting example for a FEC process is disclosed in Bigo et al., post-deadline paper OFC 2001, Anaheim, 2001, which is particularly suitable for use in the method according to the invention. Any other FEC process and/or algorithms are also suitable as well.

Device 305 is an exclusive OR-comparator (XOR) for a bit-to-bit comparison of the data. Device 306 allows a further check with control bits and error correction. The device 306 usually includes a DSP (digital signal processor) running special algorithms.

The outgoing data from the forward error corrector 304 are then delivered and received by client 307.

The invention claimed is:

1. A method for the detection of bit errors in the processing of digitalized transmitted data, whereby the data are transmitted by a non-differential optical signal transmission system, comprising the following steps
    a) transmitting optical signals over a transmission line,
    b) providing a data channel for the optical transmission of the signals,
    c) twinning the data channel of step b) with a complementary channel,
    d) amplifying the optical signals in a Raman amplifier,
    e) demultiplexing the data channel from the complementary channel,
    f) collecting the data carried by the complementary channel and the data carried by the data channel, and
    g) comparing the data carried by the complementary channel with the data carried by the data channel.

2. A method according to claim 1 wherein step g) is carried out by comparing bit by bit of each channel.

3. A method according to claim 1 wherein the data channel and the complementary channel are spaced apart in a frequency range of from 10 to 1000 GHz.

4. A method according to claim 1 wherein the information carried by the data channel is replicated on the complementary channel.

5. A method according to claim 1 wherein the complementary channel has opposite polarity with respect to the data channel.

6. A method according to claim 1 wherein a plurality of data channels are twinned with complementary channels.

7. A method according to claim 1 wherein the data channel and the complementary channel are demultiplexed at a reception device.

8. A method according to claim 7 wherein the complementary channel is filtered out after being demultiplexed.

9. A method according to claim 1 wherein a plurality of data channels are twinned with corresponding complementary channels.

10. A telecommunication system with a plurality of transmitters and receivers connected by optical transmission lines, where data is transmitted as optical signals and where the optical signals comprise additional information for a Forward Error Correction (FEC) algorithm,
    wherein the optical signals use a data channel for the optical transmission of signals and the data channel is twined with a complementary channel, and
    wherein the optical signals are amplified over a transmission line by at least one Raman amplifier, where the receivers comprise a reception module with a demultiplexer demultiplexing main and complementary channels and at least two detectors for non-differentially detecting each of the data and complementary channels and
    a controller which compares the data and complementary channels and analyzes them under the FEC algorithm.

* * * * *